(12) United States Patent
Lao et al.

(10) Patent No.: US 10,235,517 B2
(45) Date of Patent: Mar. 19, 2019

(54) ROBUST DEVICE AUTHENTICATION

(71) Applicant: Regents of the University of Minnesota, Minneapolis, MN (US)

(72) Inventors: Yingjie Lao, Minneapolis, MN (US); Keshab K. Parhi, Minneapolis, MN (US); Hyung-il Kim, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 181 days.

(21) Appl. No.: 15/154,050

(22) Filed: May 13, 2016

(65) Prior Publication Data

US 2017/0329954 A1    Nov. 16, 2017

(51) Int. Cl.
*G06F 21/44* (2013.01)
*G06F 21/73* (2013.01)

(52) U.S. Cl.
CPC .............. *G06F 21/44* (2013.01); *G06F 21/73* (2013.01); *G06F 2221/2103* (2013.01)

(58) Field of Classification Search
CPC ....... H04L 9/08; H04L 9/0861; H04L 9/0866; H04L 9/32; H04L 9/3272; H04L 9/3278; G06F 21/30; G06F 21/44; G06F 21/70; G06F 21/71; G06F 21/72; G06F 21/73; G06F 21/76
See application file for complete search history.

(56) References Cited

U.S. PATENT DOCUMENTS

| | | | |
|---|---|---|---|
| 2011/0215829 A1* | 9/2011 | Guajardo Merchan | G06F 7/588 326/8 |
| 2015/0143130 A1* | 5/2015 | Ducharme | G06F 21/73 713/189 |
| 2015/0269378 A1* | 9/2015 | Falk | H04L 9/3278 726/6 |
| 2016/0269186 A1* | 9/2016 | Wallrabenstein | G06F 21/31 |

OTHER PUBLICATIONS

Alkabani, Y.M. et al., "Active hardware metering for intellectual property protection and security," in Proceedings of the USENIX Security Symposium, 2007, pp. 291-306.
Alkabani, Y., et al., "Remote activation of ICs for piracy prevention and digital right management," in Proceedings of International Conference on Computer-Aided Design, 2007, pp. 674-677.

(Continued)

*Primary Examiner* — Shanto Abedin
*Assistant Examiner* — Adrian Stoica
(74) *Attorney, Agent, or Firm* — Westman, Champlin & Koehler, P.A.; Theodore M. Magee

(57) ABSTRACT

An apparatus includes a finite state machine and a physical structure capable of providing a response to a challenge, the physical structure such that before the physical structure is ever provided with the challenge, the response to the challenge is unpredictable. The finite state machine moves from an initial state to an intermediate state due to receiving the response from the physical structure, and moves from the intermediate state to a final state due to receiving a key. The final state indicates whether the physical structure is a counterfeit physical structure.

20 Claims, 10 Drawing Sheets

(56) References Cited

OTHER PUBLICATIONS

Alkabani, Y., et al., "N-variant IC design: methodology and applications," in Proceedings of the 45th annual Design Automation Conference, 2008, pp. 546-551.
Avvaru, S., et al., "Estimating delay differences of arbiter PUFs using silicon data," in Design, Automation and Test in Europe (DATE), 2016, pp. 543-546.
Bosch, C., et al., "Efficient helper data key extractor on FPGAs," in Proceedings of the Cryptographic Hardware and Embedded Systems—CHES 2008, 2008, pp. 181-197.
Chakraborty, R.S., et al., "HARPOON: an obfuscation-based SoC design methodology for hardware protection," IEEE Transactions on Computer-Aided Design of Integrated Circuits and Systems, vol. 28, No. 10, pp. 1493-1502, 2009.
Chen, Q., "The bistable ring PUF: A new architecture for strong physical unclonable functions," in International Symposium on Hardware-Oriented Security and Trust (HOST), pp. 134-141, 2011.
Dailey, M.D., "Authentication schemes based on physically unclonable functions," Ph.D. dissertation, Worcester Polytechnic Institute, 2009,92 pages.
Devadas, S., et al., "Secure and robust error correction for physical unclonable functions," IEEE Design and Test of Computers, vol. 27, No. 1, pp. 48-65, 2010.
Dodis, Y., et al., "Fuzzy extractors: How to generate strong keys from biometrics and other noisy data," in Proceedings of International Conference of Theory and Applications of Cryptographic Techniques, 2004, pp. 523-540.
Frikken, K.B., et al. "Robust authentication using physically unclonable functions," in Proceedings of Information Security Conference (ISC), pp. 262-277, 2009.
Gassend, B., et al., "Silicon physical random functions," in Proceedings of ACM Conference on Computer and Communications Security, 2002, pp. 148-160.
Guajardo, J., et al., "FPGA intrinsic PUFs and their use for IP protection," in Proceedings of Cryptographic Hardware and Embedded Systems (CHES 2007), 2007, 18 pages.
Juels, A., et al., "A fuzzy commitment scheme," in Proceedings of the 6th ACM conference on Computer and communications security, 1999, 21 pages.
Kumar, S.S., et al., "The butterfly PUF protecting IP on every FPGA," in Proceedings of the IEEE International Workshop on Hardware-Oriented Security and Trust, 2008, pp. 67-70.
Lao, Y., et al. "Protecting DSP circuits through obfuscation," in Proceedings of the IEEE International Symposium on Circuits and Systems (ISCAS), 2014, pp. 798-801.
Lao, Y., et al. "Statistical analysis of MUX-based physical unclonable functions," IEEE Transactions on Computer-Aided Design of Integrated Circuits and Systems, vol. 33, No. 5, pp. 649-662, 2014.
Lim, D., et al., "Extracting secret keys from integrated circuits," IEEE Transaction on Very Large Scale Integration Systems, vol. 13, No. 10, pp. 1200-1205, 2005.
Lin, Y.-M., et al. "Improved high code-rate soft BCH decoder architectures with one extra error compensation," IEEE Transactions on Very Large Scale Integration (VLSI) Systems, vol. 21, No. 11, pp. 2160-2164, 2013.
Majzoobi, M., et al., "FPGA PUF using programmable delay lines," in IEEE International Workshop on Information Forensics and Security (WIFS), 2010, pp. 1-6.
Majzoobi, M., et al., "Slender PUF protocol: A lightweight, robust, and secure authentication by substring matching," in IEEE Symposium on Security and Privacy Workshops (SPW), 2012, pp. 33-44.
Pappu, R., et al., "Physical one-way functions." Science, vol. 297, No. 5589, pp. 2026-2030, 2002.
Paral, Z., et al., "Reliable and efficient PUF-based key generation using pattern matching," in IEEE International Symposium on Hardware-Oriented Security and Trust (HOST), 2011, pp. 128-133.
Rajendran, J., et al., "Nano-PPUF: A memristor-based security primitive," in IEEE Computer Society Annual Symposium on VLSI (ISVLSI), 2012, pp. 84-87.
Rosenfeld, K., et al. "Sensor physical unclonable functions," in Proceeding of the IEEE International Symposium on Hardware-Oriented Security and Trust, 2010, pp. 112-117.
Skoric, B., et al., "Experimental hardware for coating PUFs and optical PUFs," Springer-Verlag, Ch. 15, pp. 255-268, 2007.
Suh, G.E., et al., "Design and implementation of the AEGIS single-chip secure processor using physical random functions," ACM SIGARCH Computer Architecture News, vol. 33, No. 2, pp. 25-36, 2005.
Suh, G.E., et al., "Physical unclonable functions for device authentication and secret key generation," in Proceedings the 44th Annual Design Automation Conference, 2007, pp. 9-14.
Tuyls, P., et al. "Strong authentication with PUFs," Security, Privacy and Trust in Modern Data Management, pp. 2-467, 2007.
Villasenor, J., et al., "Chop-shop electronics," IEEE Spectrum, vol. 50, No. 10, pp. 41-45, 2013.
Zhang, L., et al., "Highly reliable memory-based physical unclonable function using spin-transfer torque MRAM," in IEEE International Symposium on Circuits and Systems (ISCAS), 2014, pp. 2169-2172.
Zhang, J., et al., "FPGA IP protection by binding finite state machine to physical unclonable function," in 23rd International Conference on Field Programmable Logic and Applications (FPL), 2013, pp. 1-4.

* cited by examiner

ROBUST DEVICE AUTHENTICATION

This invention was made with government support under CNS-1441639 awarded by the National Science Foundation (NSF). The government has certain rights in the invention.

BACKGROUND

Physical unclonable functions (PUFs) can extract chip-unique signatures from integrated circuits (ICs) by exploiting uncontrollable randomness due to manufacturing process variations. These signatures can then be used for many hardware security applications including authentication, anti-counterfeiting, IC metering, signature generation, and obfuscation.

SUMMARY

An apparatus includes a finite state machine and a physical structure capable of providing a response to a challenge, the physical structure such that before the physical structure is ever provided with the challenge, the response to the challenge is unpredictable. The finite state machine moves from an initial state to an intermediate state due to receiving the response from the physical structure, and moves from the intermediate state to a final state due to receiving a key. The final state indicates whether the physical structure is a counterfeit physical structure.

In a further embodiment, a method includes making a circuit design available to a third party, the circuit design including a design for a physical unclonable function and a design for a finite state machine, the design for the finite state machine having an initial state, a plurality of intermediate states and a final state. A response generated by a circuit built from the circuit design is received, wherein the circuit includes an instance of the physical unclonable function and an instance of the finite state machine. The response is generated by the instance of the physical unclonable function and the instance of the finite state machine transitions from the initial state to a first intermediate state of the plurality of intermediate states when the instance of the finite state machine receives the response. The response is used to identify a key that will cause the instance of the finite state machine to transition from the intermediate state to the final state and thereby authenticate the circuit built from the design.

In a still further embodiment, a finite state machine includes a state register holding a current state and at least one input that receives a response from a physical unclonable function and a key. Next state logic in the finite state machine uses the response from the physical unclonable function to change the current state in the state register from an initial state to a first intermediate state when the response is a first value. The next state logic uses the key to change the current state in the state register from the first intermediate state to a final state that indicates that the physical unclonable function is authentic.

DETAILED DESCRIPTION OF ILLUSTRATIVE EMBODIMENTS

Figure 1:
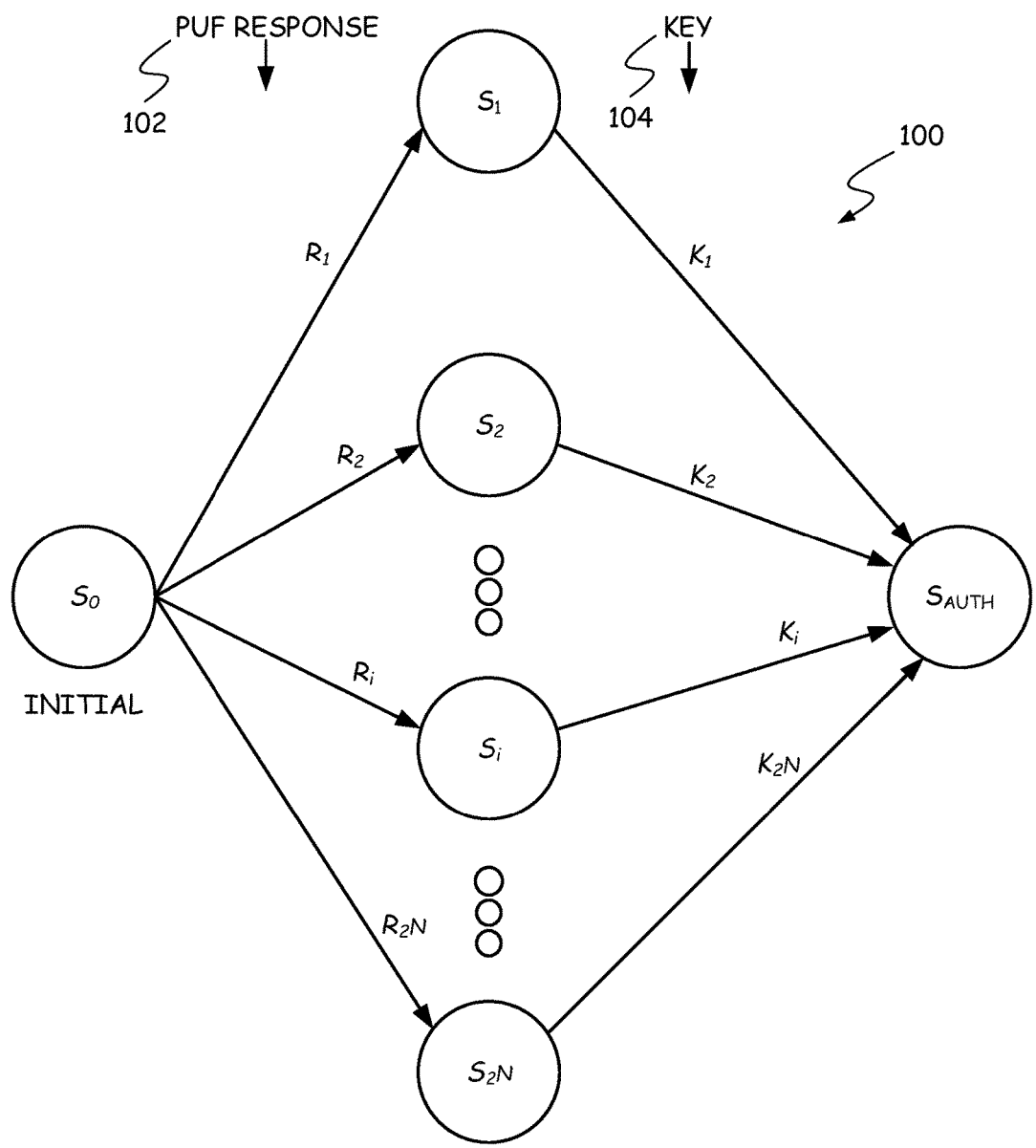
FIG. 1 is a generalized state transition graph of a Finite State Machine in accordance with various embodiments.

As electronic devices become increasingly interconnected and pervasive in people's lives, security, trustworthy computing, and intellectual property (IP) protection have notably emerged as important challenges for producing electronic devices. The assumption that hardware is trustworthy and that security effort should only be focused on networks and software is no longer valid given globalization of integrated circuits and systems design and fabrication. In 2011, the Semiconductor Industry Association pegged the cost of electronics counterfeiting at US $7.5 billion per year in lost revenue and tied it to the loss of 11,000 U.S. jobs. From a national defense perspective, unsecured devices can be compromised by the enemy, putting military personnel and equipment in danger. Therefore, securing IC chips is extremely important.

Physical Unclonable Function (PUF) is one emerging security primitive, which is a powerful tool for chip authentication and cryptographic applications. A PUF can be any of a variety of physical structures made up of microstructures that vary in unpredictable ways due to random physical factors introduced during manufacturing. Rather than embodying a single cryptographic key, PUFs implement challenge-response authentication to evaluate the microstructures in the PUF. The "challenge" is a stimulus that is applied to the PUF and the "response" is the reaction that the PUF has to the challenge. Due to the variations in the microstructures, the response that a PUF will provide for a challenge is unpredictable before the challenge is actually provided to the PUF. Ideally, a particular instance of a PUF will provide the same response each time it receives a same challenge.

A specific challenge and its corresponding response together form a challenge-response pair or CRP. The device's identity is established by the properties of the microstructure itself. As this structure is not directly revealed by the challenge-response mechanism, such a device is resistant to spoofing attacks.

Contrary to standard digital systems, PUFs extract secrets from complex properties of a physical material rather than from storing them in a non-volatile memory. It is nearly impossible to predict, clone or duplicate PUFs. When a PUF is provided with a challenge at the PUF's input, the response at the PUF's output should satisfy the following three properties: (i) Unique output due to inter-chip variation, (ii) Random output that is difficult or impossible to model or predict, and (iii) Reliable output that is consistent across different environmental conditions. The challenge and response pairs (CRPs) of a PUF are used to generate chip-unique signatures for an authentication system.

Unfortunately, PUFs are noisy in nature. The response of a PUF is affected by intra-chip variation sources such as temperature changes, voltage drifts, and aging effects. The reported PUFs, such as optical PUF, multiplexer PUF, ring oscillator PUF, butterfly PUF, SRAM PUF, sensor PUF, bistable ring PUF, memristor PUF, and spin-transfer torque MRAM PUF, are not 100% stable and as a result will provide different responses at different times when provided with a same challenge. However, cryptography in general relies on the existence of precisely reproducible keys. As a result, it is clear that the plain PUF responses are not suitable as cryptographic keys.

One solution to this problem is to view the variations in the responses as the introduction of errors into the response value and to add a stage to correct the errors. In order to obtain reliable responses from PUFs, while still keeping PUFs attractive for low-cost hardware applications, the error correction technique must be implemented in hardware as well. Moreover, its implementation should be area-efficient; otherwise, it will defeat the purpose of using PUFs in lightweight hardware devices.

Embodiments described herein provide finite-state machine (FSM) architectures that can be used with a PUF to implement various authentication protocols. The FSM architectures include an initial state, a collection of intermediate states, and one or more final states. When the PUF generates a response to a challenge, that response is input to the FSM, causing the FSM to transition from the initial state to one of the intermediate states. A key is then provided to the FSM to cause the FSM to transition from the intermediate state to another intermediate state or to a final state. When the FSM reaches a final state, an output is generated based on the final state and is used in the authentication protocol. For example, the output can indicate whether the PUF is genuine or counterfeit.

In some embodiments, the PUF and the FSM are constructed on the same substrate. In still further embodiments, the PUF and the FSM are constructed on the same substrate as other circuit components and the output of the FSM controls whether the other circuit components operate. In particular, if the FSM does not reach a final state or the FSM reaches a final state that indicates that the PUF is counterfeit, the FSM prevents the other circuit components from operating. On the other hand, if the FSM reaches a final state that indicates that the PUF is genuine, the FSM allows the other circuit components to operate.

In some embodiments, the FSM is self-correcting, thereby eliminating the use of high overhead error correcting techniques as discussed further below.

The major advantage of using a FSM is that it is not extractable from the synthesized design. Thus, even for an adversary who has access to the synthesized transistor-level design of the FSM, extracting or changing the FSM would require significant redesign of all the stages. By utilizing the benefit of a FSM, the present embodiments achieve a lightweight, secure and reliable authentication approach.

FSM Architecture

This section presents a FSM of the various embodiments that has utility in PUF-based authentication, IP binding, and IC metering. The general concept is illustrated in state transition graph (STG) 100 of FIG. 1. The FSM begins in initial state $S_0$ and then transitions from initial state $S_0$ to one of a plurality of intermediate states $S_1 \rightarrow S_{2^N}$ due to a PUF response 102 to a challenge. The FSM transitions from the intermediate state to a final state $S_{AUTH}$ (Authenticated) when key 104 matches a key assigned to the intermediate state. In one embodiment, each intermediate state has a unique key that is required to transition to final state $S_{AUTH}$. When the FSM enters final state $S_{AUTH}$, the PUF is considered to have been authenticated and this authentication can be used to activate the correct functionality of other circuit components or to perform other authentication function. Basically, this architecture requires unique mapping pairs between PUF response and key, i.e., $(R_i, K_i)$.

It is important to note that $(R_i, K_i)$ can be arbitrarily designed. Thus, all such possible pairs are only known to the designer. For an N-bit PUF response, there will be $2^N$ intermediate states. The length of the key will be at least be N, if we ensure only one value of the key could transit the FSM into the desired final state. Note that the lengths of the PUF response and the key are not necessarily identical, i.e., N-to-N mappings. A longer key can be used to increase the complexity of the structure. Further, at the expense of increasing the probability of key collision, multiple PUF responses can also be mapped into one intermediate state or multiple key values can be designed as correct inputs to a PUF response. Moreover, the $(R_i, K_i)$ mappings can be designed differently for different chips. As a result, an adversary with access to the response and key authentication records from other devices will be unable to authenticate a new device.

Figure 2:
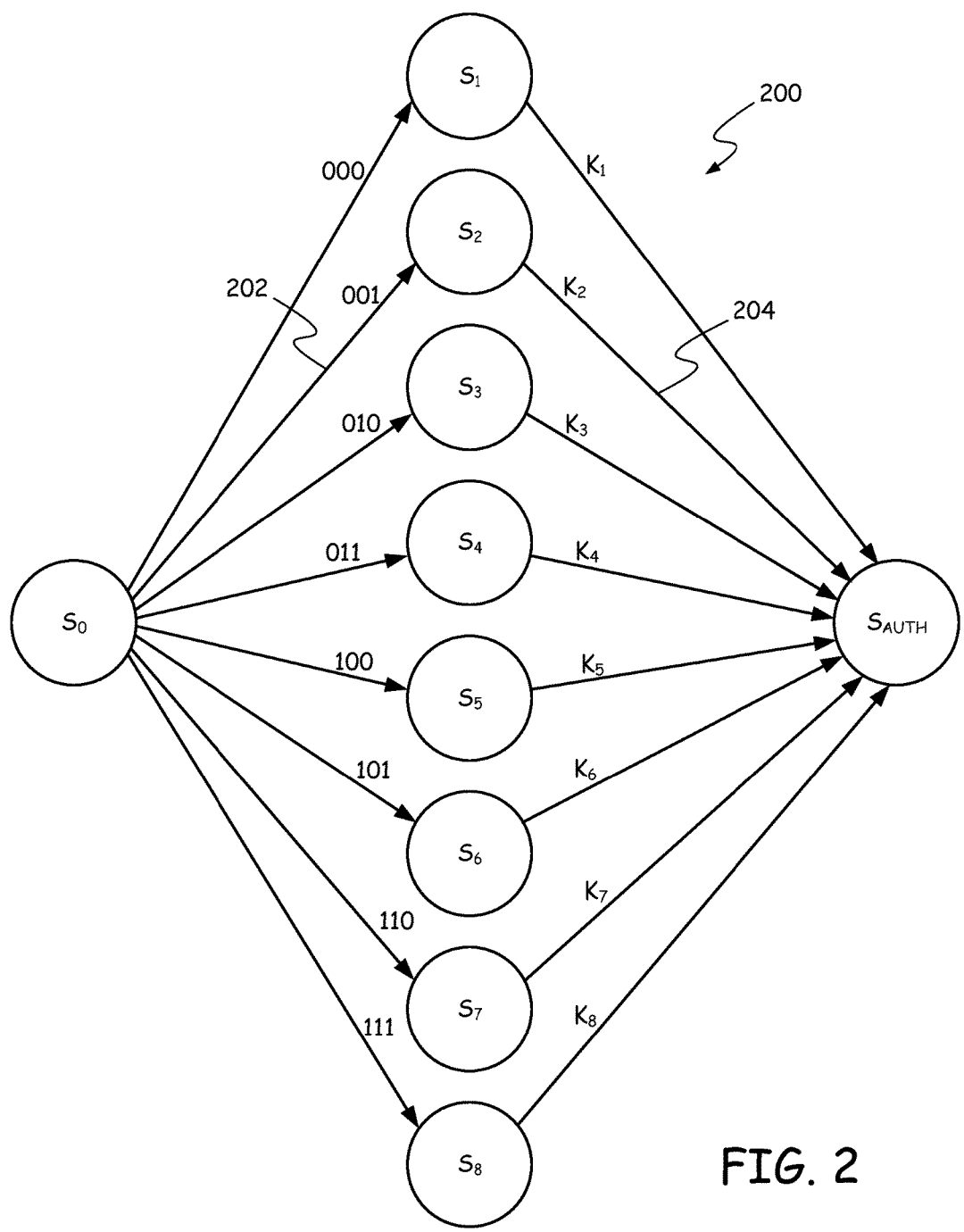
FIG. 2 is a state transition graph of a specific Finite State Machine in accordance with various embodiments.

An example of a state transition graph 200 for a FSM that accepts 3-bit PUF responses is shown in FIG. 2. In FIG. 2, the FSM is shown to include an initial state $S_0$, a plurality of intermediate states $S_1$-$S_8$, and a final state $S_{AUTH}$. The edges between initial state $S_0$ and the intermediate states $S_1$-$S_8$ are labeled with the values of the PUF response, $R_i$, that will cause the FSM to transition from initial state $S_0$ to the respective intermediate state. For example, PUF response "001" shown on edge 202 will cause the FSM to transition from state $S_0$ to intermediate state $S_2$. Similarly, the edges between the intermediate states and final state $S_{AUTH}$ are labeled with a key designation for the key that will cause the FSM to transition from the intermediate state to final state $S_{AUTH}$. For example, key $K_2$ on edge 204 will cause the FSM to transition from intermediate state $S_2$ to final state $S_{AUTH}$. The correct $(R_i, K_i)$ pairs are summarized in Table I, where the values of $K_i$ can be arbitrarily chosen.

TABLE I

Key values that can successfully authenticate the corresponding PUF response for FIG. 2

| $R_i$ | correct $K_i$ |
|---|---|
| 000 | $K_1$ |
| 001 | $K_2$ |
| 010 | $K_3$ |
| 011 | $K_4$ |
| 100 | $K_5$ |

TABLE I-continued

Key values that can successfully authenticate
the corresponding PUF response for FIG. 2

| $R_i$ | correct $K_i$ |
|---|---|
| 101 | $K_6$ |
| 110 | $K_7$ |
| 111 | $K_8$ |

Figure 3:
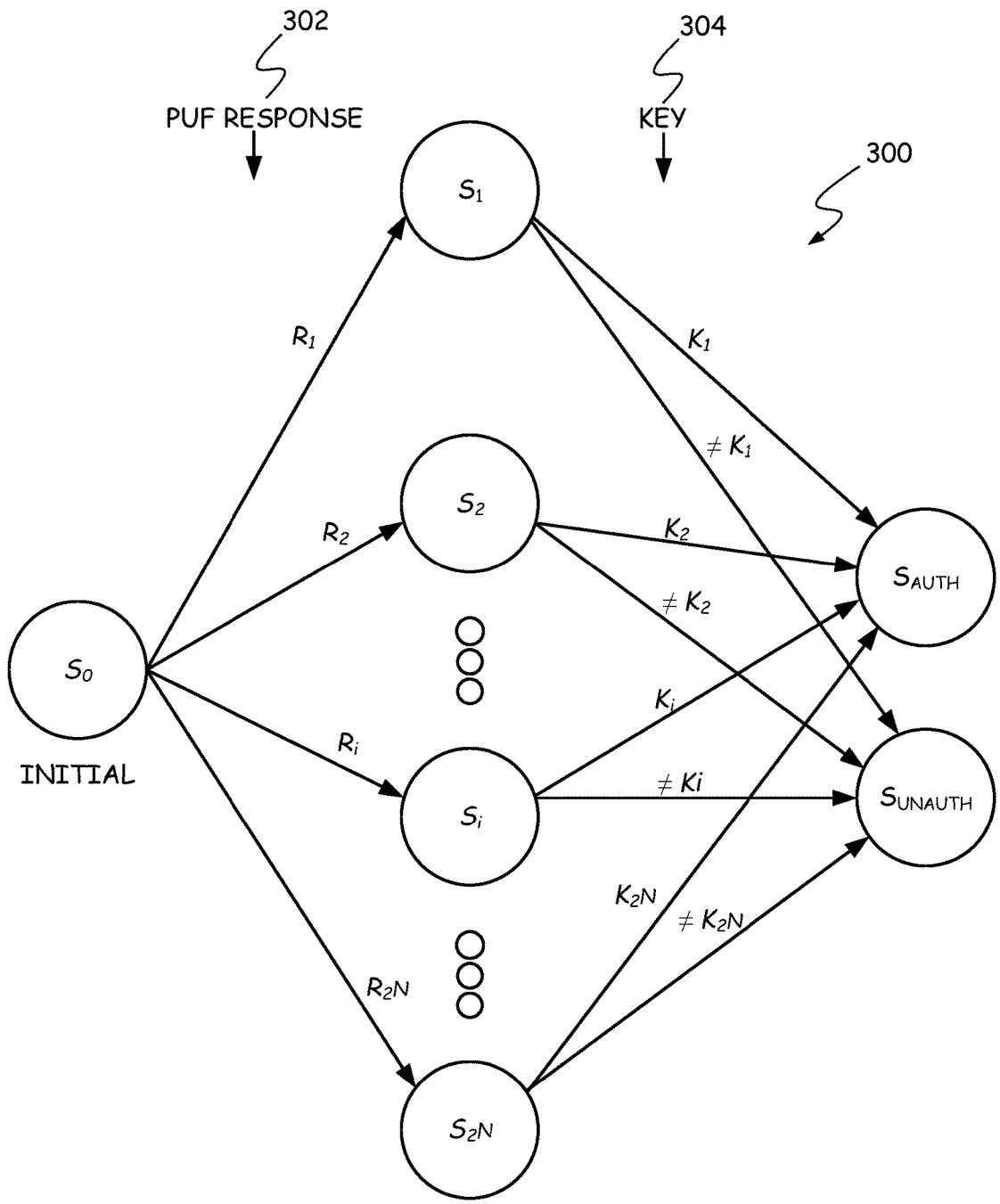
FIG. 3 is a generalized state transition graph of a Finite State Machine in accordance with various further embodiments.

FIG. 3 provides a state transition graph 300 for a further embodiment of the FSM. In FIG. 3, the FSM transitions from $S_0$ to one of a plurality of intermediate states $S_1$-$S_{2^N}$ due to PUF response 302. From each intermediate state, the FSM either transitions to final state $S_{AUTH}$, when received input key 304 is the correct key for the PUF response, associated with the intermediate state, or transitions to final state $S_{UNAUTH}$ (Unauthenticated), when the received input key 304 is not the correct key for the PUF response. When the FSM enters final state $S_{UNAUTH}$, some embodiments lock the chip or trigger an alarm to report a possible attack.

Figure 4:
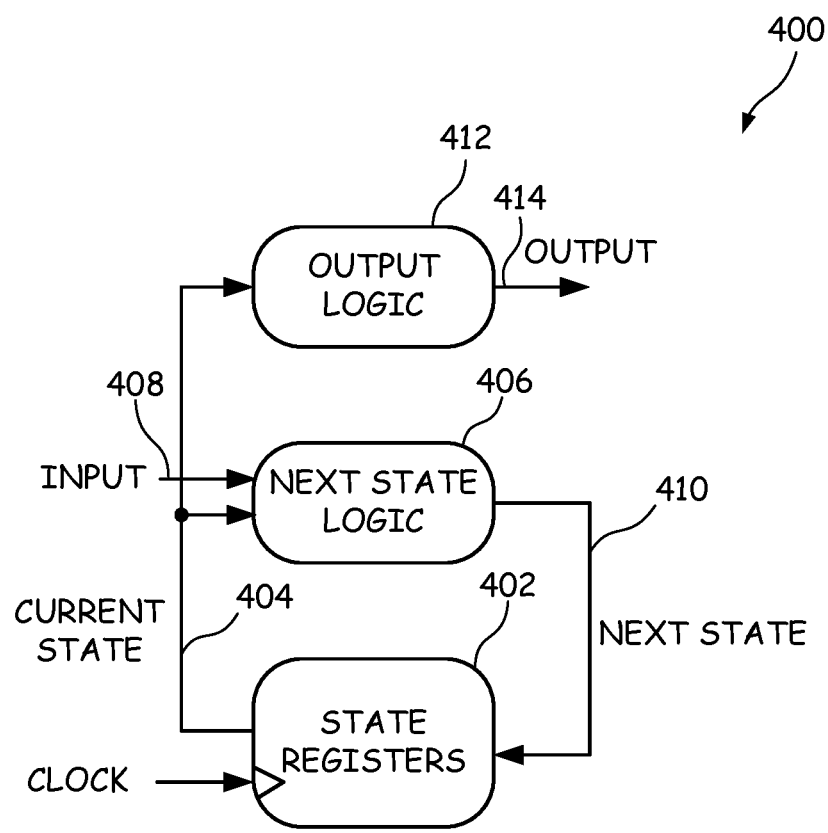
FIG. 4 is a block diagram of a Finite State Machine in accordance with various embodiments.

A FSM is usually defined by a 6-tuple (I, O, S, $S_0$, F, G), where S is a finite set of internal states, I and O represent finite set of inputs and outputs of the FSM, respectively, F are next-state functions, G is an output function, and $S_0$ is the initial state. FIG. 4 provides a block diagram of a FSM 400 showing these elements. In FIG. 4, the current state 404 of the FSM is set in state registers 402. Current state 404 is any one of the finite set of internal states S, including the intermediate states, the authenticated and unauthenticated final states, and the initial state $S_0$. Current state 404 is provided to Next State Logic 406, which also receives inputs 408 (I). Inputs 408 include the PUF's response to the challenge and the Key, which can be provided on separate input lines and/or provided at separate times. Next State Logic 406 includes the next-state functions F that determine a next state 410 based on the current state 404 and the inputs 408. A CLOCK input to state registers 402, controls when next state 410 is written to state registers 402, thereby changing current state 404 to next state 410. Current state 404 is also provided to output logic 412, which generates an output 414 based on current state 404. For example, output 414 can be a locking signal that locks the chip until current state 404 is at the Authenticated State. In other embodiments, output 414 is an error-corrected PUF response associated with the intermediate state that FSM 400 was in before reaching the Authenticated State.

Anti-Counterfeit Application

Figure 5:
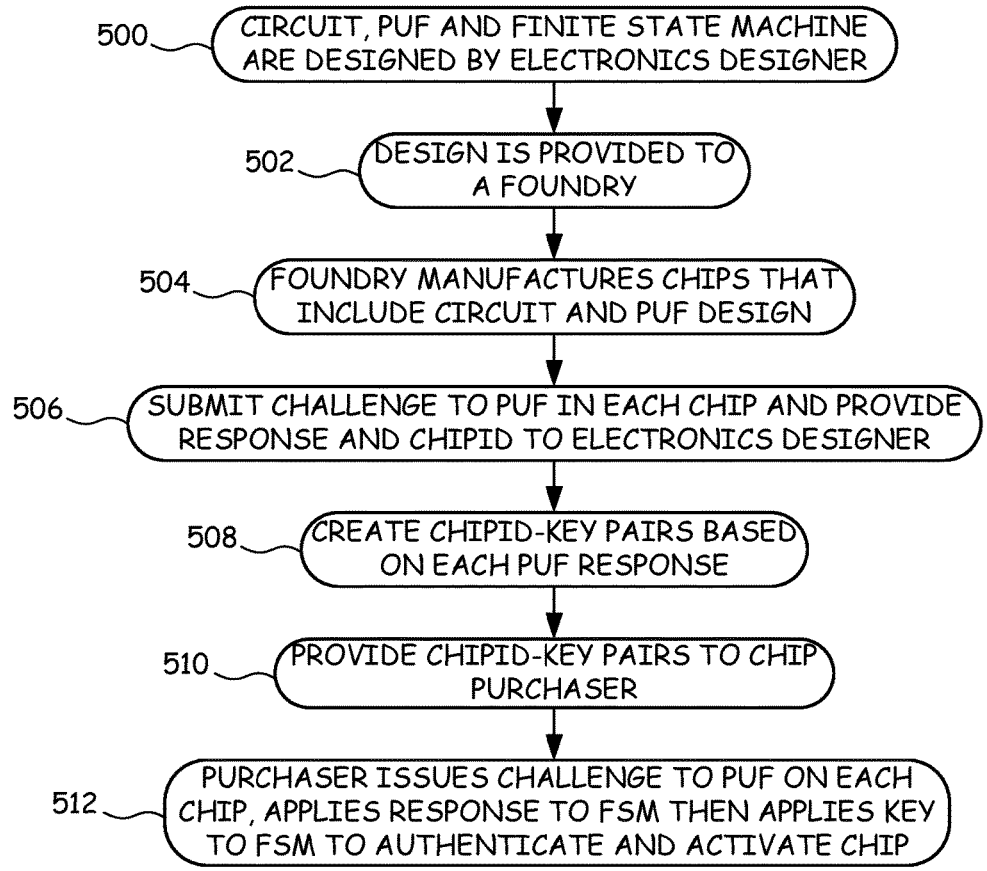
FIG. 5 is a flow diagram of a method of preventing chip counterfeiting in accordance with some embodiments.

In accordance with one embodiment, the FSM is used as part of a method to prevent counterfeiting of electronic designs. One example of such a method is shown in the flow diagram of FIG. 5. In FIG. 5, an electronics designer designs a circuit and integrates a PUF and the FSM of the present embodiments into the design at step 500. The PUF response-key ($R_i$, $K_i$) pairs are set at step 500 as part of designing the FSM. At step 502, the electronics designer sends the detailed manufacturable design specifications to third party, such as a Foundry or other manufacturer. The Foundry makes the masks and manufactures multiple instances of the chips implementing this design at step 504. Each chip will be uniquely locked after fabrication due to the inter-chip variations of the PUFs and the locking action of the FSM.

At step 506, a challenge is applied to the input of the PUF of each chip to generate a PUF response and an identifier for the chip and the PUF response are provided to the electronics designer. This challenge can be applied by the Foundry or by the electronics designer. At step 508, the electronics designer uses the PUF response to retrieve the corresponding Key for that response that will place the FSM in the authenticated final state $S_{AUTH}$. The electronics designer then forms a ChipID-Key pair using the unique identifier for the chip and the retrieved key. In some embodiments, the electronics designer forms a ChipID-Key-Challenge trio that includes the unique identifier for the chip, the retrieved key, and the challenge to be applied to the PUF. This allows different challenges to be applied to different chips, thereby increasing the security of the chips. At step, 510, the electronics designer provides the ChipID-Key pairs (or ChipID-Key-Challenge trios) to a purchaser of the chips. At step 512, the purchaser activates each chip by first applying the challenge to the PUF and receiving the PUF's response. The PUF's response is then applied to the input of the FSM to cause the FSM to transition to one of the intermediate states and then the Key is applied to the FSM to cause the FSM to enter the authenticated final state $S_{AUTH}$. When the FSM enters authenticated final state $S_{AUTH}$, the output of the FSM activates the circuit components locked by the FSM and thereby allows the circuit components to function.

The method of FIG. 5 prevents the production of counterfeit chips that incorporate the electronic design. For example, the method stops the Foundry from making and selling extra copies of the chips because those extra chips will be locked and cannot be unlocked without the specific key needed for each chip. Since the Foundry does not receive those keys, the Foundry has no means for unlocking the chips. Even if the Foundry were to learn of one key for one chip, the Foundry would not be able to use that key on other chips, since each chip has a unique key due to the unique response of each chip's PUF.

FSM with Error Correction

A. Self-Correcting Functionality

In accordance with further embodiments, an FSM structure is provided that not only performs PUF-based authentication, but also correct errors in PUF responses due to environmental variations to improve the robustness.

Once a key has been assigned to a chip, such as after step 508 of FIG. 5, the PUF ideally provides the same response to the challenge each time the challenge is applied to the PUF. However, due to environmental factors, the PUF can produce erroneous responses to the challenge from time to time. In accordance with one embodiment, these erroneous responses are treated as coding errors and are divided into two categories: those that are correctable and those that are not. In accordance with one embodiment, the distinction between correctable and uncorrectable errors is based on the Hamming Distance between the PUF response and the expected PUF response. In particular, a value for the Hamming Distance is selected as the threshold between correctable and uncorrectable PUF responses and the FSM is designed to correct all PUF responses that have a Hamming Distance from the expected PUF response that is within the threshold.

Figure 6:
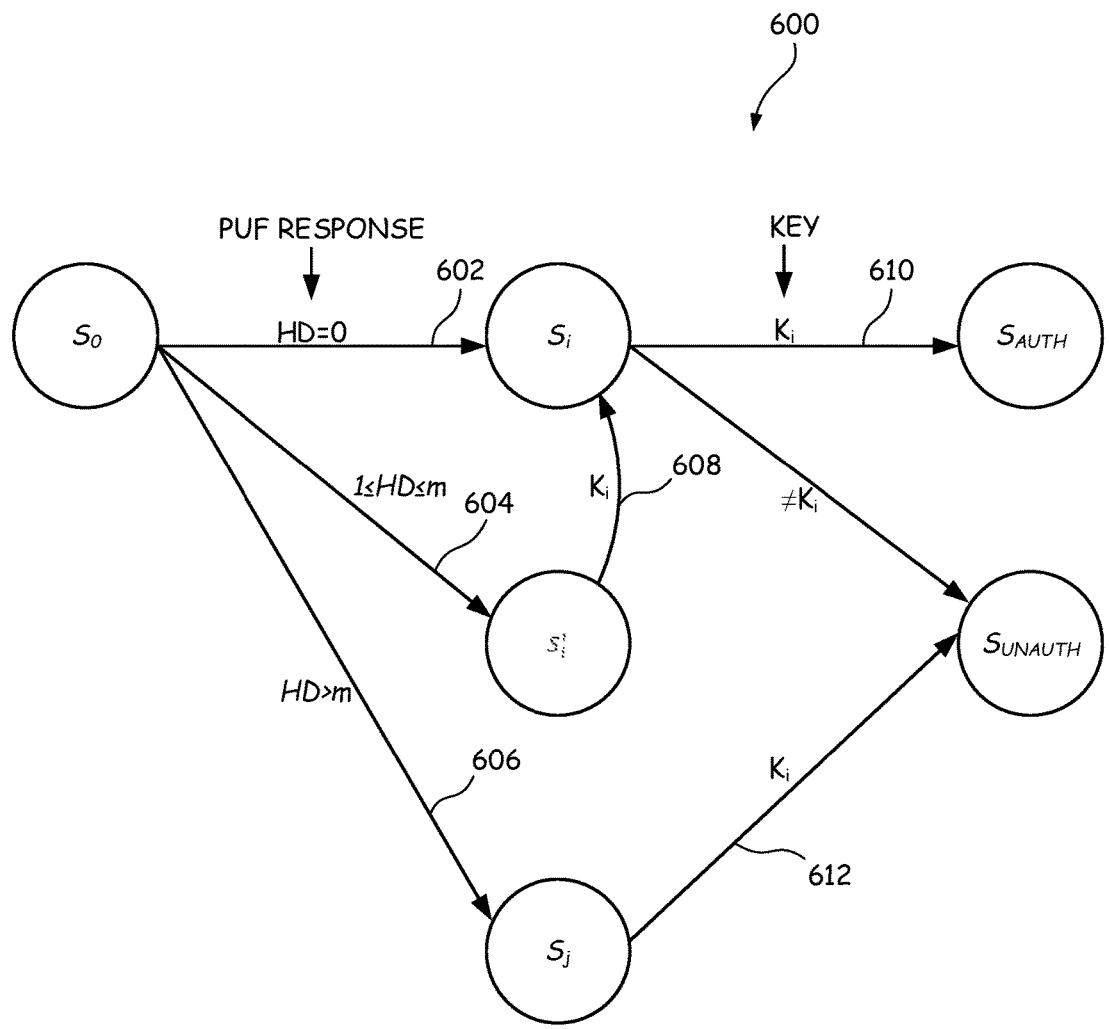
FIG. 6 is a generalized state transition graph of a self-correcting Finite State Machine in accordance with various embodiments.

FIG. 6 provides a condensed state transition graph 600 for a FSM with such error correction. Graph 600 includes an initial state $S_0$, an expected intermediate state $S_i$, collections of erroneous intermediate states $S_i'$ and $S_j$ and final states $S_{AUTH}$ and $S_{UNAUTH}$. The FSM transitions from the initial state $S_0$ to the expected intermediate state $S_i$ when an expected PUF response 602 is received. The collection of erroneous intermediate states $S_i'$ represents all intermediates states that correspond to PUF responses 604 that have a Hamming Distance (HD) from expected PUF response 602 that is greater than one but less than or equal to a threshold Hamming Distance of m bits. For example, if m is one and the PUF response is a 3-bit response, there are three PUF responses within the threshold Hamming distance of the expected PUF response for intermediate state $S_i$, and as a result, $S_i'$ is a collection of three erroneous intermediate states. Because of their Hamming Distance is within the threshold, these erroneous intermediate states are considered correctable. $S_j$ represents all intermediate states that correspond to PUF responses 606 that have a Hamming Distance from expected PUF response 602 that is greater than m and are therefore considered uncorrectable. For example, if m is one and the PUF response is a 3-bit response, there are four PUF responses that have a Hamming distance that is greater than one from expected PUF response 602, and as a result, intermediate state $S_j$ is a collection of four uncorrectable intermediate states.

To allow the FSM of FIG. 6 to correct erroneous PUF responses 604, additional edges 608 are provided between the collection of correctable erroneous intermediate states $S_i'$ and the expected intermediate state $S_i$. Each edge is associated with the correct key $K_i$ for the expected PUF response such that when the correct key $K_i$ is applied to the FSM, the FSM transitions from one of the erroneous intermediate states $S_i'$ to the expected intermediate state $S_i$. A second application of the correct key $K_i$ then causes the FSM to transition along edge 610 to the authorized final state $S_{AUTH}$. If the correct key $K_i$ is applied while the FSM is in one of the uncorrectable erroneous intermediate states $S_j$, the FSM transitions to unauthenticated final state $S_{UNAUTH}$ along edge 612. The advantage of the proposed approach is the inherent redundancy built into the self-correcting FSM by contiguously entering the key twice that eliminates the need for an extra error correcting code. In accordance with one embodiment, the key is provided to the FSM only once but is internally applied by the FSM twice.

Figure 7:
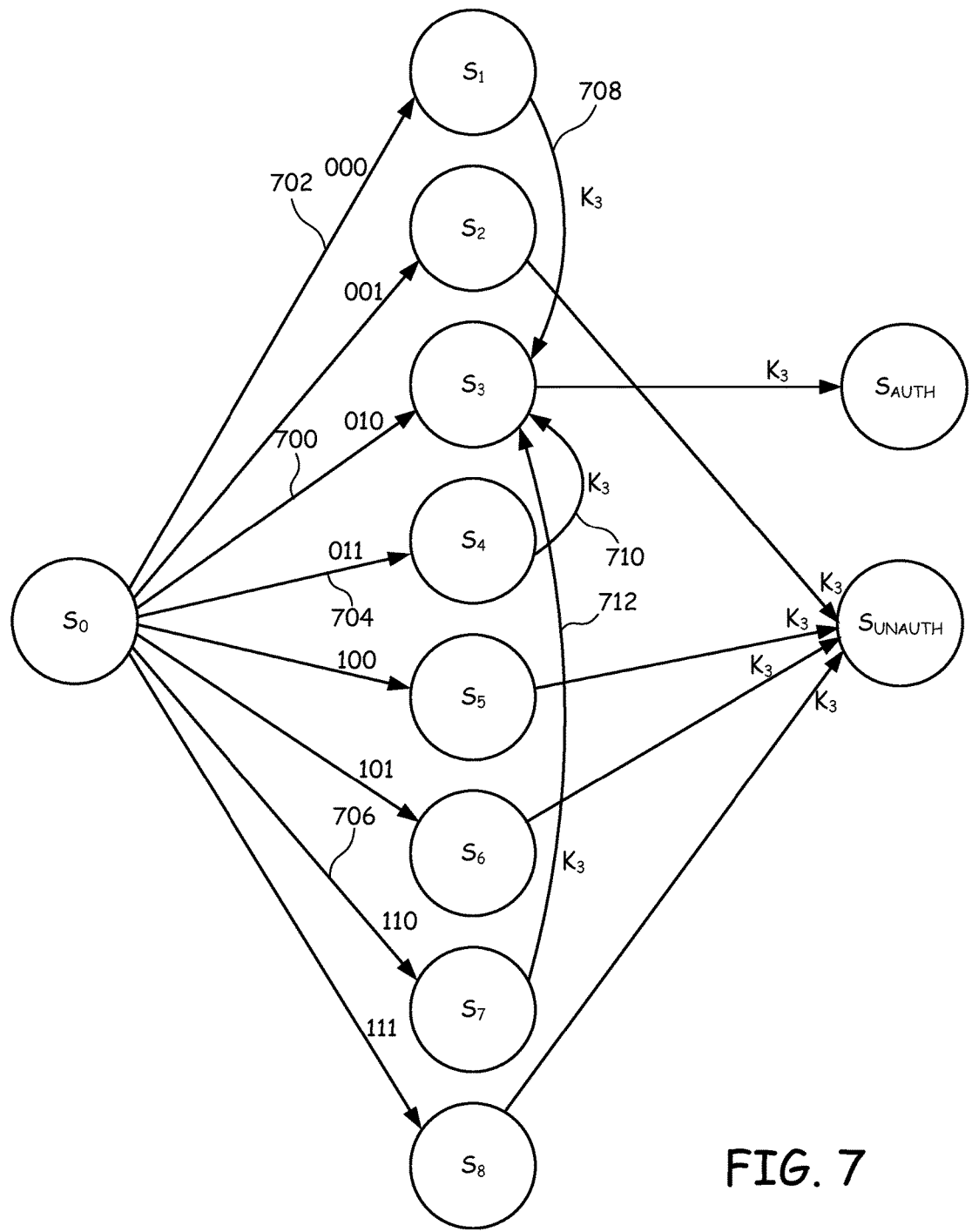
FIG. 7 is a state transition graph of a specific self-correcting Finite State Machine in accordance with various embodiments.

FIG. 7 provides a state transition graph for a FSM with error correction that uses a 3-bit PUF response. In FIG. 7, the state transition graph shows all of the transitions from initial state $S_0$ to intermediate states $S_1$-$S_8$ based on respective PUF responses but only shows the transitions from intermediate states $S_1$-$S_8$ for key $K_3$, which is the key for transitioning from intermediate state $S_3$ to authenticated state $S_{AUTH}$. In the FSM of FIG. 7, erroneous PUF responses with a Hamming Distance of one bit from PUF response 700 are corrected. This allows the PUF to be authenticated even when the PUF response varies by one bit due to environmental variations. For example, in FIG. 7, PUF responses 702, 704 and 706 each have a Hamming Distance from PUF response 700 of one bit. To correct these errors, the FSM of FIG. 7 includes additional respective edges 708, 710 and 712 from the corresponding intermediate states $S_1$, $S_4$, and $S_7$ to intermediate state $S_3$. The FSM transitions along edges 708, 710 and 712 upon receiving key $K_3$, which is the correct key for transitioning from intermediate state $S_3$ to authenticated state $S_{AUTH}$. Thus, if the FSM erroneously arrives at any of intermediate states $S_1$, $S_4$, and $S_7$ when it should have been at state $S_3$, applying key $K_3$ twice will allow the PUF to be authenticated. For other PUF responses that have Hamming distances of 2 or greater from PUF response 700, $K_3$ would not be able to bring the FSM back into the authenticated state. The complete next state table of the FSM design is presented in Table II.

TABLE II

Key values can successfully authenticate the corresponding PUF response with self-correction

| Present State | Next State | | | | | | | |
|---|---|---|---|---|---|---|---|---|
| | $K_1$ | $K_2$ | $K_3$ | $K_4$ | $K_5$ | $K_6$ | $K_7$ | $K_8$ |
| $S_0$ | $S_0$ | $S_0$ | $S_0$ | $S_0$ | $S_0$ | $S_0$ | $S_0$ | $S_0$ |
| $S_1$ | Auth | $S_2$ | $S_3$ | Unauth | $S_5$ | Unauth | Unauth | Unauth |
| $S_2$ | $S_1$ | Auth | Unauth | $S_4$ | Unauth | $S_6$ | Unauth | Unauth |
| $S_3$ | $S_1$ | Unauth | Auth | $S_4$ | Unauth | Unauth | $S_7$ | Unauth |
| $S_4$ | Unauth | $S_2$ | $S_3$ | Auth | Unauth | Unauth | Unauth | $S_8$ |
| $S_5$ | $S_1$ | Unauth | Unauth | Unauth | Auth | $S_6$ | $S_7$ | Unauth |
| $S_6$ | Unauth | $S_2$ | Unauth | Unauth | $S_5$ | Auth | Unauth | $S_8$ |
| $S_7$ | Unauth | Unauth | $S_3$ | Unauth | $S_5$ | Unauth | Auth | $S_8$ |
| $S_8$ | Unauth | Unauth | Unauth | $S_4$ | Unauth | $S_6$ | $S_7$ | Auth |
| Auth | Auth | Auth | Auth | Auth | Auth | Auth | Auth | Auth |
| Unauth | Unauth | Unauth | Unauth | Unauth | Unauth | Unauth | Unauth | Unauth |

Adding the error correcting functionality to the FSM will degrade the level of security. The probability for the adversary to guess the key value for a given PUF response will increase from $$\frac{1}{2^N} \text{ to } \frac{1+N}{2^N},$$

if one bit error can be corrected for an N-bit PUF response. More generally, for m bits correction in an N-bit PUF response $$1 + \sum_{i=1}^{m} \binom{N}{m}$$

key values can bring a certain intermediate state to the correct Auth state, while there are $2^N$ possible key values in total. In the example of FIG. 7, 4 out of 8 possible key values can authenticate the corresponding PUF response. The details of successful key values that can authenticate the corresponding PUF response are presented in Table III.

TABLE III

Key values can successfully authenticate the corresponding PUF response with self-correction

| $R_i$ | correct $K_i$ | Other successful K1 |
|---|---|---|
| 000 | $K_1$ | $K_2$, $K_3$, $K_5$ |
| 001 | $K_2$ | $K_1$, $K_4$, $K_6$ |

TABLE III-continued

Key values can successfully authenticate the corresponding
PUF response with self-correction

| $R_i$ | correct $K_i$ | Other successful K1 |
|---|---|---|
| 010 | $K_3$ | $K_1$, $K_4$, $K_7$ |
| 011 | $K_4$ | $K_2$, $K_3$, $K_8$ |
| 100 | $K_5$ | $K_1$, $K_6$, $K_7$ |
| 101 | $K_6$ | $K_2$, $K_5$, $K_8$ |
| 110 | $K_7$ | $K_3$, $K_5$, $K_8$ |
| 111 | $K_8$ | $K_4$, $K_6$, $K_7$ |

For example, besides $K_3$, three other key values $K_1$, $K_4$, $K_7$ can also authenticate the PUF response 010. However, when N is large (e.g., N=256), the value of $$\frac{1+N}{2^N} = \frac{257}{2^{256}}$$

will still be very small for a 1-bit correction scheme. Even for m=7 and N=256, the value of $$\frac{1+\sum_{i=1}^{m}\binom{N}{m}}{2^N}$$

is still $1.17 \times 10^{-64}$. Furthermore, a requirement for a practical PUF is that the PUF responses should have a large inter-chip variation (50% Hamming distance ideally) so that even in the presence of noise it is possible to distinguish responses originating from different devices. Therefore, key collision of the proposed self-correcting approach would not be an issue for PUF-based authentication. A set of distinguishable keys can be obtained for different chips even if the $(R_i, K_i)$ pairs are designed equivalently. Moreover, the length of the key can be increased to improve the security.

Generally speaking, if we want to correct up to m bits of an N-bit PUF response, $$\sum_{i=1}^{m}\binom{N}{m}$$

extra transition edges need to be inserted for each intermediate state in the state transition graph of the FSM without error correction. However, the extra transition edges introduced by the error correcting functionality only affect Next State Logic 406 of FSM 400, while output logic 412 and the size of state registers 402 remain the same. As a result, we can expect the extra design complexity would be relatively small for the self-correcting FSM structure, which only involves an N-to-N combinational logic synthesis.

Furthermore, although the state size will increase exponentially with the length of PUF response, the size of state registers 402 will only increase linearly. For an N-bit PUF response, there are $2^N$ intermediate states in the proposed FSM. However, the state registers only need to store N+1 bits in total (including $S_0$, Auth, and Unauth). For example, when N=3 as shown in FIG. 7, only a 4-bit state register is required, as there are 11 states in the design. Therefore, the self-correcting FSM of the various embodiments enables lightweight yet reliable PUF-based authentication.

Note that the key in various self-correcting FSM embodiments is not public and only the electronics designer or an authenticated user has knowledge of the correct key. Furthermore, the fact that the PUF response and authentication key pairs $(R_i, K_i)$ can be arbitrarily designed, and are not based on an established algorithm, also enhances security. There is no inherent equation for the FSM. In other words, even if an adversary knows the PUF response (or key) in a $(R_i, K_i)$ pair, it is still infeasible to guess the corresponding key (or PUF response). Another advantage is that the successful key values are separated from each other by a large Hamming Distance. For example, even for two pairs $(R_i, K_i)$ and $(R_j, K_j)$ where the Hamming distance of the two PUF responses $R_i$ and $R_j$ is only 1, the Hamming distance of the two keys $K_i$ and $K_j$ could be very large. Additionally, that extraction of the corresponding state transition graph of the FSM from the circuit layout of the FSM is a computationally intractable task, thereby providing a very high level of security.

Resiliency to Attack

The proposed PUF based authentication with self-correction approach rests upon the assumption that the manufacturer or the adversary does not know and cannot compute the correct values of the key based on the PUF responses. Otherwise, the manufacturer or the adversary could just program these values on overproduced copies and the intellectual property cannot be protected. Therefore, the security of the proposed method stands largely on the adversary's ability to find a key K for a PUF response R that unlocks the system.

The goal of attacks is to determine the correct values of the key inputs. The naive idea of brute-force search does not work. If the length of the key is N, average $2^{N-1}$ attempts are required to obtain the correct key value for a given PUF response. Clearly, this is not practical. Another possible attack is to predict the correct key value for a given PUF response after collecting a large number of PUF response and key pairs by modeling the relationship between the PUF responses and the keys. However, this attack is also unlikely to succeed because the PUF response and key pair mappings can be designed arbitrarily. This means that, with proper key selection, there is little or no correlation between the PUF responses and the keys making it extremely difficult to model the relationship between the PUF responses and the Keys. To ensure that there is little correlation between the PUF responses and the Keys, various embodiments sets the Keys using complex functions on the PUF responses, including various types of non-linear functions whose outputs are not heavily repetitive. For example, a polynomial function can be used to design the PUF response and key pair mappings.

Other Applications

The proposed self-correcting FSM can be extended for other applications. In this section, we discuss a number of other possible applications where the FSM can be used.

A. Two-Factor Authentication

The proposed self-correcting FSM can also be used for the so-called two-factor authentication. The challenge of a PUF is combined with the key to achieve stronger hardware protection. The authenticated device, correct PUF challenge, and correct key are required for the two-factor authentication. In other words, the $(R_i, K_i)$ pair is extended to a $(C_i, R_i, K_i)$ trio. The state of the proposed FSM is determined by $R_i$ and $K_i$, while $R_i$ can be calculated by the challenge $C_i$ for a given PUF. However, a PUF is a one-way function in the sense that it is hard to reconstruct the challenge from the response. Therefore, even if the adversary knows the desired ($R_i$, $K_i$) pair, it is still infeasible for the adversary to compromise the device without knowing the correct challenge. Additionally, the ($R_i$, $K_i$) pairs can be designed differently for different devices. As a result, ($C_i$, $R_i$) and ($R_i$, $K_i$) pairs will be unique for each chip. The security can be greatly improved by the proposed two-factor authentication. The security properties are summarized below:

(a) The device cannot be duplicated.

(b) The user is unable to authenticate without the device.

(c) The device cannot be used by someone else to successfully authenticate the device without the correct key.

(d) An adversary with access to the response and key authentication records from other devices is still unable to authenticate a new device without the correct challenge.

(e) The device does not need to store any information.

B. Signature Generation

The proposed self-correcting FSM architecture can also be utilized for reliable signature generation. In particular, the self-correcting FSM can be used to generate an error-corrected PUF response that can be used as a signature for the PUF.

Figure 8:
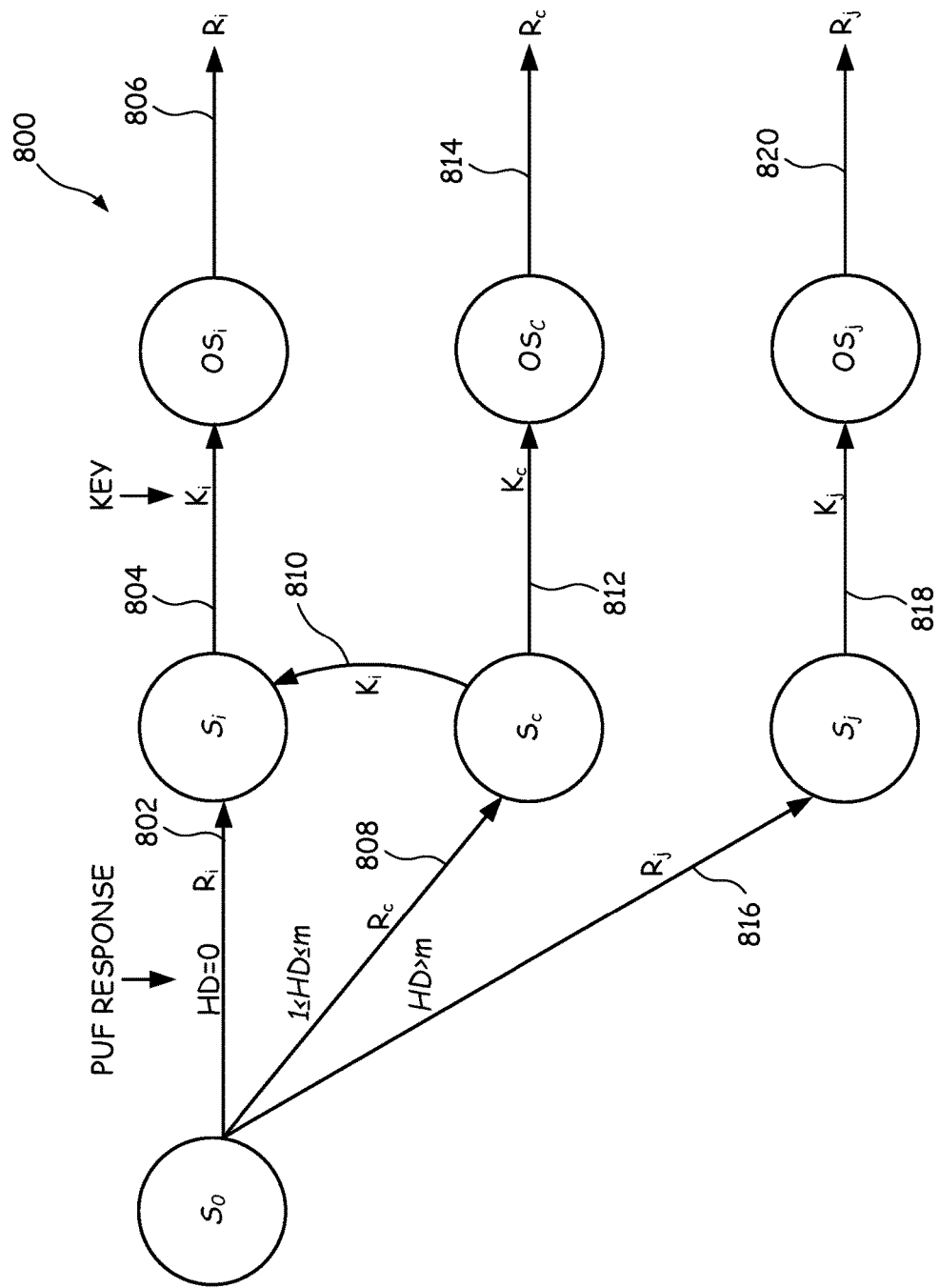
FIG. 8 is a generalized state transition graph of a self-correcting Finite State Machine used to provide error corrected PUF responses in accordance with various embodiments.

FIG. 8 provides a state transition graph 800 of such an FSM. In FIG. 8, if the PUF provides an expected response 802, $R_i$, the FSM transitions from initial state $S_0$ to expected intermediate state $S_i$. The application of key $K_i$ then causes the FSM to transition along edge 804 to output state $OS_i$, which causes the output logic of the FSM to output the expected PUF response $R_i$ as the signature 806 for the PUF. If the PUF provides one of a collection of correctable erroneous response 808, $R_c$, the FSM transitions from initial state $S_0$ to one of a collection of correctable erroneous intermediate states $S_c$. Transition edges 810 between each of the correctable erroneous intermediate states $S_c$ and the expected intermediate state $S_i$ allow the FSM to correct the errors in PUF response 808 by transitioning to expected intermediate state $S_i$ when key $K_i$ is received. When key $K_i$ is then received a second time, the FSM transitions to output state $OS_i$, which causes the output logic of the FSM to output the expected PUF response $R_i$ as the signature 806 for the PUF instead of the erroneous PUF response 808 that was actually output by the PUF. Thus, the FSM corrects erroneous signatures of the PUF.

If a key $K_c$ is received while the FSM is in intermediate state $S_c$, the FSM transitions along edge 812 to output state $OS_c$, which causes the output logic of the FSM to output PUF response $R_c$ as the signature 814 for the PUF. The reception of key $K_c$ indicates that PUF response $R_c$ was the expected PUF response and intermediate state $S_c$ was the expected intermediate state.

If the PUF provides one of a collection of uncorrectable erroneous response 816, $R_j$, the FSM transitions from initial state $S_0$ to one of a collection of uncorrectable intermediate state $S_j$. In the FSM, there are no edges that will allow the FSM to transition from an uncorrectable intermediate state $S_j$ to expected state $S_i$. If a key $K_j$ is received while the FSM is in intermediate state $S_j$, the FSM transitions along edge 818 to output state $OS_j$, which causes the output logic of the FSM to output PUF response $R_j$ as the signature 820 for the PUF. The reception of key $K_j$ indicates that PUF response $R_j$ was the expected PUF response and intermediate state $S_j$ was the expected intermediate state.

During signature generation, the key value is made public. However, it is still infeasible to predict the corresponding PUF response even if the adversary knows the key value. Note that in signature generation, key values are considered as public information, which is different from the application of authentication where key values are secret information. Different FSM designs can be used in different applications.

C. Hierarchical Authentication

In a further embodiment, the PUF and FSM system of authentication are used in hierarchical authentication. In such embodiments, a local system consists of a central control part, one or more components and a number of different sub-systems. Each of the sub-systems in turn can include a further control part, one or more components and/or one or more sub-systems. Each component and the control parts of the local system and the sub-systems include a respective PUF and FSM for authenticating the system/sub-system/component. The local system is authenticated using a key provided by a trusted server that is remote to the local system. The components and central controls of the subsystems of the local system are authenticated by keys provided by the central control of the local system. The components and central controls of the subsystems of each subsystem are authenticated by keys provided by the subsystem and so forth. The local system will be functional only after the central control of the local system passes the remote authentication by the server and each of the components and subsystems of the local system pass local authentication by the central control of the local system.

Figure 9:
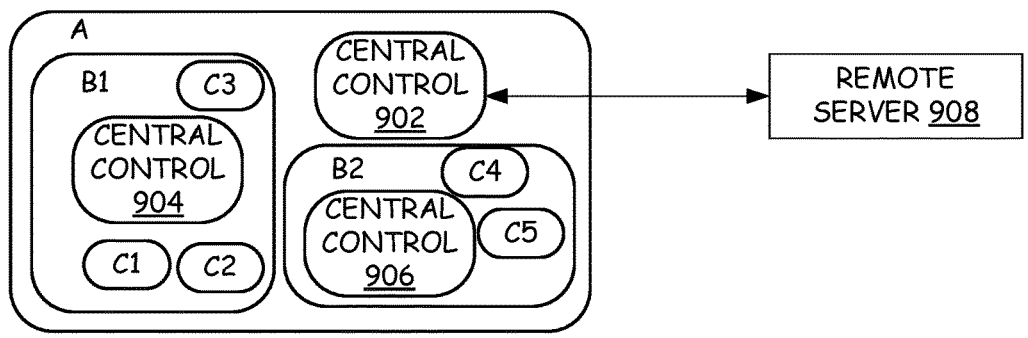
FIG. 9 is a block diagram of elements used in hierarchical authentication in accordance with various embodiments.

An example of a 3-level hierarchical authentication is shown in FIG. 9. In this example, a local system A includes a central control 900 and two sub-systems B1 and B2. Subsystem B1 includes a central control 902 and components C1, C2, and C3, and subsystem B2 includes a central control 904 and components C4 and C5. Each of the components C1, C2, C3, C4, and C5 include a respective PUF and FSM on chip and each of central controls 902, 904 and 906 include a respective PUF and FSM.

After assembling local system A, a remote server 908 authenticates central control 900 of local system A. First, a challenge value is applied to the input of the PUF of central control 900 to generate a response that is then applied to the FSM of central control 900. This PUF response causes the FSM to enter an intermediate state. Remote server 908 then provides a key to the FSM of central control 900 to cause the FSM to enter the Authenticated state if the PUF is authentic. Central control 900 contains keys for authenticating central controls 904 and 906 of systems B1 and B2. After central control 900 is authenticated, central control 900 causes a respective challenge value to be sent to the inputs of the respective PUFs on central controls 904 and 906. The responses of the PUFs are applied to the respective FSMs on central controls 904 and 906 and cause the FSMs to enter intermediate states. Central control 900 then applies a respective key to each respective FSM on central controls 904 and 906 to cause the FSMs to enter the Authenticated state if the respective PUF is authentic. When central control 904 is authenticated, central control 904 authenticates components C1, C2 and C3 by causing a respective challenge value to be applied to the inputs of the respective PUF of each component C1, C2 and C3. The responses of the respective PUFs are applied to the respective FSM of each component C1, C2 and C3 to place the FSM in an intermediate state and keys for the FSMs of each respective component C1, C2 and C3 that are stored on central control 904 are used to cause the respective FSM to enter the Authenticated state. Similarly, when central control 906 is authenticated, central control 906 authenticates components C4 and C5 by causing a respective challenge value to be applied to the inputs of the respective PUF of each component C4 and C5. The responses of the respective PUFs are applied to the respective FSM of each component C4 and C5 to place the FSM in an intermediate state and keys for the FSMs of each respective component C4 and C5 that are stored on central control 906 are used to cause the respective FSM to enter the Authenticated state.

Hierarchical Authentication Leads to the Following Advantages:

(i) Degrees of freedom in authentication: Depending on the security requirements of various Intellectual Property blocks, appropriate authentication circuits and obfuscation approaches can be adopted for each Intellectual Property block. This allows heterogeneity in levels of security for different blocks.

(ii) Third-party IP authentication: The components in a device may come from different sources. Counterfeit or malicious parts can be integrated into devices without being noticed along the design flow. Integrated circuits would be very vulnerable when a key component fails. Therefore, authentication needs to be performed not only for the whole system, but also to identify selected components of the device.

(iii) Hierarchy in security levels: A hierarchy of privilege can be realized through hierarchical protection, such that different users can be granted access to the functionality of each component depending on the desired access rights to the owners of IP and the user.

VI. Hardware Implementation

In accordance with one embodiment, circuits are synthesized using a Design Compiler with optimization parameters set for minimum area and mapped to a 65 nm standard cell library. The same bit-length is used for both the PUF response and the key in one embodiment.

A. Implementation Details

In one embodiment, a script is used to automatically generate Verilog code of the self-correcting FSM based on two parameters: the PUF response bit-length N, and the number of tolerated error bits m. Using the script, we can assign $(R_i, K_i)$ pairs manually with a certain function or randomly with the built-in pseudo random number generator.

In an effort to simplify the implementation and reduce the length of the final generated Verilog code, the FSM is generated using the following steps in one embodiment:

1. Write a module that implements a 4-bit permutation (a permutation of series from 0 to 15).
2. Call the 4-bit permutation module $$\frac{N}{4}$$

times to generate the correct $(R_i, K_i)$ pairs. Thus, the length of the PUF response is a multiple of 4 in this embodiment.
3. Manually or randomly permute the N output bits of all $$\frac{N}{4}$$

modules to generate the final correct $(R_i, K_i)$ mappings.
4. Generate the next-state function of FSM in the Verilog code automatically using the script based on the $(R_i, K_i)$ pairs obtained from above steps and complete the output function of the FSM.
5. According to the error-correcting capability parameter m set in the script, the extra transition edges are added into the FSM in the Verilog code.

It is important to note that the presented design method is only one option, the FSM can be designed arbitrarily and even with different bit-lengths of the PUF response and the key.

B. Area and Power

Table IV and Table V show the area and power consumptions of the FSM as shown in FIG. 6, respectively, for different design parameters (i.e., N and m). Note that when m=0, the implemented structure is reduced to the FSM without self-correction as shown in FIG. 3. The results include average area and power overheads over a number of different implementations, where the PUF response and key value mappings are randomly designed (including both manual simple bitwise comparison and highly random perturbation). Note that by using the script to generate the Verilog code automatically, the area and power only vary slightly with different random $(R_i, K_i)$ pairs.

TABLE IV

Area (gate count) of the proposed self-correcting FSM that can correct m bits of an N-bit PUF response

| | N | | | | | |
|---|---|---|---|---|---|---|
| m | 4 | 8 | 16 | 32 | 64 | 128 |
| 0 | 70 | 114 | 197 | 367 | 709 | 1399 |
| 1 | 85 | 134 | 235 | 470 | 919 | 1810 |
| 2 | | 147 | 265 | 507 | 985 | 1909 |
| 3 | | | 281 | 514 | 994 | 1963 |
| 4 | | | | 519 | 1009 | 2031 |
| 5 | | | | 534 | 1018 | 2042 |
| 6 | | | | 537 | 1038 | 2049 |
| 7 | | | | 541 | 1045 | 2061 |

TABLE V

Power (µW) of the proposed self-correcting FSM that can correct m bits of an N-bit PUF response

| | N | | | | | |
|---|---|---|---|---|---|---|
| m | 4 | 8 | 16 | 32 | 64 | 128 |
| 0 | 0.60 | 0.95 | 1.66 | 3.03 | 5.79 | 11.44 |
| 1 | 0.63 | 1.00 | 1.91 | 3.61 | 6.83 | 13.47 |
| 2 | | 1.12 | 2.08 | 3.80 | 7.47 | 14.55 |
| 3 | | | 2.11 | 3.87 | 7.61 | 15.14 |
| 4 | | | | 3.93 | 7.87 | 15.58 |
| 5 | | | | 3.97 | 8.01 | 15.86 |
| 6 | | | | 4.07 | 8.19 | 16.02 |
| 7 | | | | 4.13 | 8.28 | 16.16 |

As expected, the area and power consumptions are not very significant. For example, the area of the proposed FSM for a 128-bit PUF response with 7 bits error correction is only equivalent to 2061 NAND2 gates, while the power consumption is about 16 µW. This can be compared to 1399 gates and 11 µW with no error correction for a 128-bit PUF response.

Figure 10:
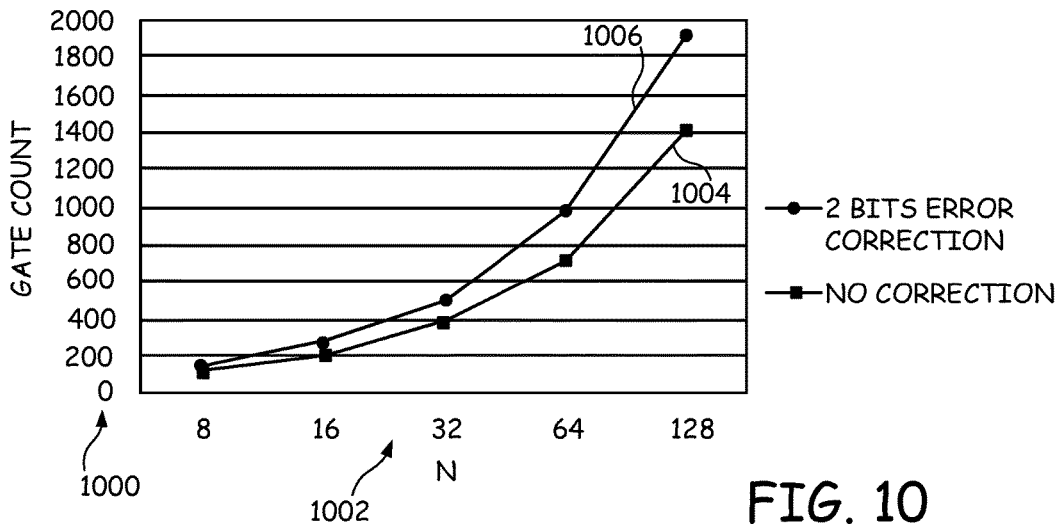
FIG. 10 provides graphs of gate counts as a function of bit length for different types of FSMs in accordance with the various embodiments.

FIG. 10 provides graphs of gate counts for different values of bit length N. In FIG. 10, gate counts are shown on vertical axis 1000 and bit length N is shown on horizontal axis 1002. In particular, graph 1004 shows the gate counts for different values of N for m=0 (without self-correction) and graph 1006 shows the gate counts for different values of N for m=2 (with 2 bits error correction). It can be observed that when the bit-length N is doubled, the area is also almost doubled for a fixed m. The power consumption exhibits a similar trend.

Figure 11:
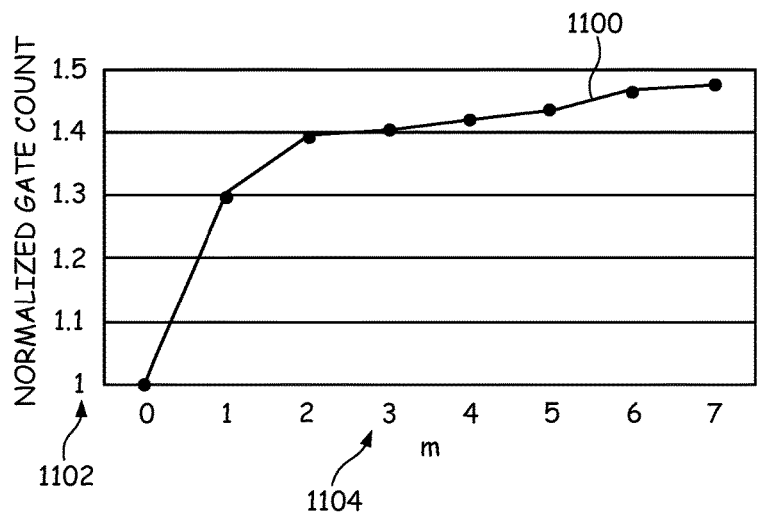
FIG. 11 provides a graph of normalized gate counts for different levels of error correction in accordance with various embodiments.

FIG. 11 shows a graph 1100 of gate counts for different m for N=64, where a normalized gate count is shown on vertical axis 1102 and values for m are shown on horizontal axis 1104. The normalized gate count is normalized to the gate count of the FSM when m=0 and N=64. It can be seen that the overhead is about 30% for adding 1-bit error correcting functionality into the conventional FSM. However, as m increases, the additional overhead in area or power consumption becomes less and less. For example, the overhead is 47% when m=7, while the overhead is already 39% when m=2. Therefore, we can expect that overhead of the proposed self-correcting FSM would be reasonable even for a large m. Note that we can draw similar conclusions for area and power consumptions of the FSM with other values of N, as shown in Table IV and Table V above.

When comparing with the PUF circuit, we find that the area consumption of the proposed FSM is usually greater than the area consumption of the PUF circuit, since PUFs are very compact. For example, the area consumption of the proposed FSM for a 64-bit PUF response with 2 bits error correction is 1.32 times that of the 64-stage arbiter PUF. This is also the reason that design of low-overhead error correcting method for PUF-based authentication is very important.

C. Comparison to BCH Codes

The various error correction embodiments use less area and power than other error correction techniques. For comparison, a BCH decoder was synthesized using the same 65 nm standard cell library as was used to form an error correcting FSM embodiment. The area and power consumptions for the BCH decoder using different parameters are presented in Table VI and Table VII, respectively. Note that the values of N are chosen to 1 be less than $2^n$, as that is the highest value permitted in the finite field of $2^n$.

TABLE VI

Area (gate count) of the BCH Codes

| | N | | |
|---|---|---|---|
| m | 31 | 63 | 127 |
| 1 | 1031 | 1370 | 1760 |
| 2 | 1816 | 2410 | 3092 |
| 3 | 2612 | 3460 | 4435 |
| 4 | 3419 | 4519 | 5789 |
| 5 | 4231 | 5580 | 7153 |
| 6 | 5039 | 6646 | 8527 |
| 7 | 5854 | 7720 | 9908 |

TABLE VII

Power (µW) of the BCH Codes

| | N | | |
|---|---|---|---|
| m | 31 | 63 | 127 |
| 1 | 181.67 | 228.86 | 286.60 |
| 2 | 319.54 | 401.99 | 503.07 |
| 3 | 458.77 | 576.39 | 721.18 |
| 4 | 598.77 | 751.31 | 940.61 |
| 5 | 739.70 | 926.44 | 1161.15 |
| 6 | 881.98 | 1102.21 | 1382.33 |
| 7 | 1024.90 | 1238.89 | 1604.58 |

It can be seen from these results and Tables IV and V that the proposed self-correcting FSM consumes about 2× to 10× less area and about 20× to 100× less power than the BCH codes. Therefore, it can be concluded that the cost of correcting PUF response can be significantly reduced using the error-correcting FSM embodiments described herein. Particularly, the power consumption can be reduced to 1%~5% of the BCH codes. Additionally, as discussed above, the extra overhead of the proposed self-correcting FSM will be small for a large number of tolerated error bits m. However, for the BCH codes, it can be observed from Table VI and Table VII that both the area and power consumptions increase linearly with the number of tolerated error bits. Therefore, we can expect that the area consumption of the embodiments will be significantly less than the BCH codes for a large m.

Figure 12:
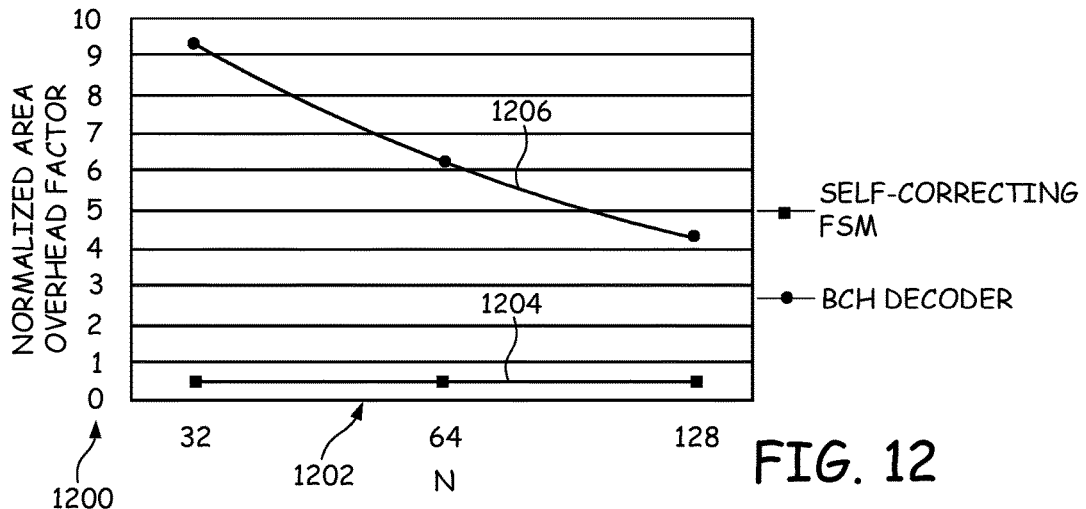
FIG. 12 provides graphs comparing normalized area overhead of a BCH decoder to normalized area overhead of a self-correcting FSM embodiment.
Figure 13:
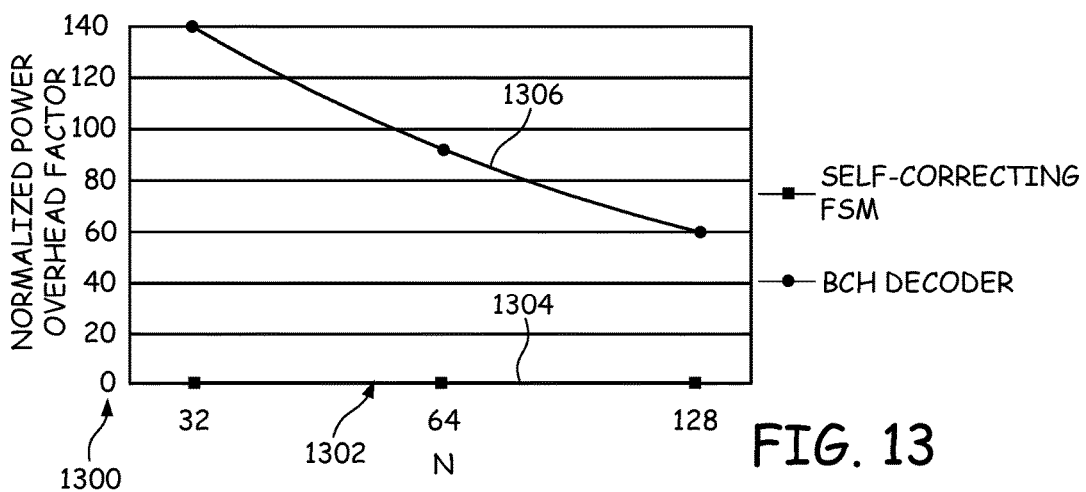
FIG. 13 provides graphs comparing normalized power overhead of a BCH decoder to normalized power overhead of a self-correcting FSM embodiment.

Furthermore, it is important to note that the FSM architecture of the various embodiments not only corrects the errors, but also has the capability for PUF-based authentication. If we only consider the design complexity for the error correcting functionality itself, the proposed approach would be much more lightweight and low-cost compared to the BCH codes. For example, we consider the overhead of introducing 4 bits error correcting functionality to the FSM without error correction. The area and power overhead results for both the proposed self-correction FSM and the BCH codes are shown in FIG. 12 and FIG. 13, respectively. In FIG. 12, an area overhead factor, normalized to the area of the FSM without error correction, is shown on vertical axis 1200 and the number of bits N in the response is shown on horizontal axis 1202. A graph 1204 shows the normalized area overhead factor as a function of the number of bits N for a self-correcting FSM and a graph 1206 shows the normalized area overhead factor as a function of the number of bits N for a BCH decoder. In FIG. 13, a power overhead factor, normalized to the power of the FSM without error correction, is shown on vertical axis 1300 and the number of bits N in the response is shown on horizontal axis 1302. A graph 1304 shows the normalized power overhead factor as a function of the number of bits N for a self-correcting FSM and a graph 1306 shows the normalized power overhead factor as a function of the number of bits N for a BCH decoder.

It can be seen that the normalized overheads of the BCH codes are significantly greater than those of the proposed self-correcting FSM. For instance, when N=128 and m=4, the normalized area overhead for the proposed self-correcting FSM is 9× less than the BCH codes, while the normalized power overhead for the proposed self-correcting FSM is 167× less than the BCH codes. It can also be observed that the overhead incurred by BCH codes will decrease as N increases. However, the length of PUF response used for authentication is usually relatively small (N≤256). Therefore, it can be concluded that the overhead of the proposed self-correcting FSM is significantly less than the BCH codes for the PUF-based authentication.

Although the present invention has been described with reference to preferred embodiments, workers skilled in the art will recognize that changes may be made in form and detail without departing from the spirit and scope of the invention.

What is claimed is:

1. An apparatus comprising:
   a physical structure capable of providing a response to a challenge, the physical structure such that before the physical structure is ever provided with the challenge, the response to the challenge is unpredictable; and
   a finite state machine moving from an initial state to an intermediate state due to receiving the response from the physical structure, and moving from the intermediate state to a final state due to receiving a key, the final state indicating whether the physical structure is a counterfeit physical structure and the key being arbitrarily designated relative to the response wherein the finite state machine is configured to move from multiple different intermediate states to the final state by using a different key for each of the multiple different intermediate states.

2. The apparatus of claim 1 wherein the physical structure and the finite state machine are formed on a same substrate.

3. The apparatus of claim 1 wherein the physical structure is on a same substrate as other circuit components and wherein when the final state of the finite state machine indicates that the physical structure is genuine, the finite state machine allows the other circuit components to operate.

4. The apparatus of claim 1 wherein the physical structure is on a same substrate as other circuit components and wherein when the final state of the finite state machine indicates that the physical structure is a counterfeit, the finite state machine prevents the other circuit components from operating.

5. The apparatus of claim 1:
wherein the physical structure is further capable of providing an erroneous second response to the input challenge value; and
wherein the finite state machine:
moves from the initial state to a second intermediate state due to receiving the erroneous second response from the physical structure;
moves from the second intermediate state to the intermediate state due to receiving the key; and
moves from the intermediate state to the final state due to receiving the key a second time.

6. The apparatus of claim 1 wherein the finite state machine outputs the response when the finite state machine reaches the final state.

7. The apparatus of claim 1 wherein the physical structure comprises a physical unclonable function.

8. The apparatus of claim 1 wherein the physical structure is part of a subsystem that is incorporated into a local system, and wherein the key is provided by a control in the local system.

9. The apparatus of claim 8 wherein the local system further comprises:
a second physical structure capable of providing a second response to a second challenge, the second physical structure such that before the second physical structure is ever provided with the second challenge, the second response to the second challenge is unpredictable; and
a second finite state machine moving from a second initial state to a second intermediate state due to receiving the second response from the second physical structure, and moving from the second intermediate state to a second final state due to receiving a second key, the second final state indicating whether the second physical structure is a counterfeit physical structure.

10. The apparatus of claim 9 wherein the second key is received from a remote location.

11. A method comprising:
making a circuit design available to a third party, the circuit design including a design for a physical unclonable function and a design for a finite state machine, the design for the finite state machine having an initial state, a plurality of intermediate states and a final state wherein the finite state machine is configured to move from each of the plurality of intermediate states to the final state;
receiving a response generated by a circuit built from the circuit design, wherein the circuit includes an instance of the physical unclonable function and an instance of the finite state machine and wherein the response is generated by the instance of the physical unclonable function and wherein the instance of the finite state machine transitions from the initial state to a first intermediate state of the plurality of intermediate states when the instance of the finite state machine receives the response; and
using the response to identify a key that will cause the instance of the finite state machine to transition from the first intermediate state to the final state and thereby authenticate the circuit built from the design, wherein the key has previously been arbitrarily designated for the response and is different for each intermediate state of the plurality of intermediate states.

12. The method of claim 11 wherein the circuit design prevents operation of at least one circuit component until the finite state machine is in the final state.

13. The method of claim 12 further comprising providing the key to a purchaser of the circuit built from the design so that the purchaser can place the finite state machine in the final state and activate the at least one circuit component.

14. The method of claim 11 wherein the instance of the physical unclonable function generates a second response after generating the response and wherein the instance of the finite state machine transitions from the initial state to a second intermediate state of the plurality of intermediate states when the instance of the finite state machine receives the second response.

15. The method of claim 14 wherein the instance of the finite state machine transitions from the second intermediate state to the first intermediate state when the finite state machine receives the key.

16. The method of claim 11 wherein the response is generated by the instance of the physical unclonable function when a challenge associated with the key is applied to the instance of the physical unclonable function.

17. A finite state machine comprising:
a state register holding a current state;
at least one input that receives a response from a physical unclonable function and a key that has an arbitrary value relative to a first value for the response; and
next state logic that:
when the current state is an initial state and the response is the first value, uses the response from the physical unclonable function to change the current state in the state register to a first intermediate state; when the current state is the first intermediate state, uses the key to change the current state in the state register to a final state that indicates that the physical unclonable function is authentic; and
when the current state is a second intermediate state, using a second key different than the key to change the current state in the state register to the final state that indicates that the physical unclonable function is authentic.

18. The finite state machine of claim 17 wherein the next state logic:
when the current state is the initial state and the response is a second value, uses the response from the physical unclonable function to change the current state in the state register to a third intermediate state; and
when the current state is the third intermediate state, uses the key to change the current state in the state register to a final state that indicates that the physical unclonable function is counterfeit.

19. The finite state machine of claim 18 wherein the next state logic:
- when the current state is the initial state and the response is a third value, uses the response from the physical unclonable function to change the current state in the state register to a fourth intermediate state;
- when the current state is the fourth intermediate state, uses the key to change the current state in the state register to the first intermediate state; and
- when the current state is the first intermediate state, uses the key to change the current state in the state register to the final state that indicates that the physical unclonable function is authentic.

20. The finite state machine of claim 17 wherein the final state provides a value equal to the first value of the response.

* * * * *